United States Patent
Burlett et al.

(10) Patent No.: US 10,308,773 B2
(45) Date of Patent: Jun. 4, 2019

(54) CARBON NANOSTRUCTURE PREBLENDS AND THEIR APPLICATIONS

(71) Applicant: GATES CORPORATION, Denver, CO (US)

(72) Inventors: Donald James Burlett, Oxford, MI (US); Henning Richter, Newton, MA (US); Ramesh Sivarajan, Shrewsbury, MA (US); Viktor Vejins, Concord, MA (US)

(73) Assignee: Gates Corporation, Denver, CO (US)

( * ) Notice: Subject to any disclaimer, the term of this patent is extended or adjusted under 35 U.S.C. 154(b) by 0 days.

(21) Appl. No.: 15/948,632

(22) Filed: Apr. 9, 2018

(65) Prior Publication Data

US 2018/0223052 A1    Aug. 9, 2018

Related U.S. Application Data

(62) Division of application No. 15/413,013, filed on Jan. 23, 2017, now Pat. No. 9,938,383, which is a division of application No. 14/633,458, filed on Feb. 27, 2015, now Pat. No. 9,550,907.

(51) Int. Cl.

| | |
|---|---|
| *C08J 3/22* | (2006.01) |
| *C08K 3/04* | (2006.01) |
| *C08K 5/03* | (2006.01) |
| *C09D 123/16* | (2006.01) |
| *C09C 1/44* | (2006.01) |
| *C09C 1/46* | (2006.01) |
| *C09C 1/48* | (2006.01) |
| *C08J 3/20* | (2006.01) |
| *C01B 32/152* | (2017.01) |
| *C01B 32/05* | (2017.01) |
| *C01B 32/168* | (2017.01) |
| *C01B 32/174* | (2017.01) |
| *C09C 1/58* | (2006.01) |
| *C09C 1/00* | (2006.01) |

(52) U.S. Cl.
CPC .............. *C08J 3/22* (2013.01); *C01B 32/05* (2017.08); *C01B 32/152* (2017.08); *C01B 32/168* (2017.08); *C01B 32/174* (2017.08); *C08J 3/20* (2013.01); *C08J 3/223* (2013.01); *C08K 3/04* (2013.01); *C08K 3/041* (2017.05); *C08K 3/042* (2017.05); *C08K 5/03* (2013.01); *C09C 1/44* (2013.01); *C09C 1/46* (2013.01); *C09C 1/48* (2013.01); *C09D 123/16* (2013.01); *C01B 2202/02* (2013.01); *C01B 2202/06* (2013.01); *C01P 2002/82* (2013.01); *C01P 2004/03* (2013.01); *C01P 2004/13* (2013.01); *C01P 2004/133* (2013.01); *C01P 2004/84* (2013.01); *C08J 2300/26* (2013.01); *C08J 2323/16* (2013.01); *C08J 2323/20* (2013.01); *C08J 2323/22* (2013.01); *C08K 3/045* (2017.05); *C08K 2201/011* (2013.01); *C09C 1/0081* (2013.01); *C09C 1/58* (2013.01); *Y02E 60/13* (2013.01)

(58) Field of Classification Search
CPC ... C08J 3/22; C08J 3/20; C08J 2323/20; C08J 2323/16; C08J 2323/22; C08J 2300/26; C01B 32/152; C01B 2202/06; C01B 2202/02; C08K 3/04; C08K 3/045; C08K 2201/011; C01P 2004/133
USPC ............................................... 523/204
See application file for complete search history.

(56) References Cited

FOREIGN PATENT DOCUMENTS

| JP | WO2014034635 | * | 3/2014 |
| WO | 2014034635 A1 | | 3/2014 |

OTHER PUBLICATIONS

Translation of JP6344740, Mar. 6, 2014. (Year: 2014).*

* cited by examiner

*Primary Examiner* — Hui H Chin
(74) *Attorney, Agent, or Firm* — Paul N. Dunlap, Esq.; Jeffrey A. Thurnau, Esq.

(57) ABSTRACT

A method for preparing a "preblend" of nanostructured carbon, such as nanotubes, fullerenes, or graphene, and a particulate solid, such as polymer beads, carbon black, graphitic particles or glassy carbon involving wet-mixing and followed by optional drying to remove the liquid medium. The preblend may be in the form of a core-shell powder material with the nanostructured carbon as the shell on the particulate solid core. The preblend may provide particularly improved dispersion of single-walled nanotubes in ethylene-α-olefin elastomer compositions, resulting in improved reinforcement from the nanotubes. The improved elastomer compositions may show simultaneous improvement in both modulus and in elongation at break. The elastomer compositions may be formed into useful rubber articles.

21 Claims, 8 Drawing Sheets

CARBON NANOSTRUCTURE PREBLENDS AND THEIR APPLICATIONS

BACKGROUND OF THE INVENTION

1. Field of the Invention

This invention relates generally to methods of dispersing carbon nanostructures such as nanotubes in polymers, for example to make elastomer compositions, methods for forming carbon nanostructure preblends for the same, and applications of the resulting preblends and compositions.

2. Description of the Prior Art

Because carbon nanotubes ("CNT") are produced as entangled bundles of fibers, getting them to disperse in a polymer is a critical step in their utilization as reinforcing additives. A number of approaches have been used to obtain polymers with dispersed carbon nanotubes. Among these methods are melt blending of CNT into thermoplastic resins, polymerization in the presence of the CNT, high shear mixing, chemical modification of the CNT, and the use of surfactants.

Regarding mixing carbon nanotubes into rubber or elastomeric polymers, it is very difficult to disperse the CNT in a matrix material with as high a viscosity as most elastomers or rubbers have. The application of heat does not reduce the viscosity of the polymer significantly enough as it does in melt-blending into plastics. What is needed is a method to improve the dispersibility of the CNT in rubber.

U.S. Pat. No. 7,785,701 B2 discloses a carbon fiber composite material comprising an elastomer and a carbon nanofiber dispersed in the elastomer, wherein the elastomer has an unsaturated bond or a group, having affinity to the carbon nanofiber. When the affinity of the elastomer for the nanofiber is high, the dispersion is reportedly easy by the shear force of mixing, e.g. on an open roll mill. Dispersion is reportedly not so easy for nonpolar elastomers such as EPDM. The resulting mill-mixed compositions show an increase in modulus and strength but a decrease in elongation as is typical of many reinforcing fillers, relative to the composition without nanofiber.

EP 2,138,535 B1 discloses a vulcanizable composition containing a specific hydrogenated carboxylated nitrile rubber (HXNBR), a cross-linking agent and carbon nanotubes and a process for preparing such compositions. It is reported therein that solvent mixing, melt mixing and the spray drying process have been employed as processing methods to prepare some rubber/CNT composites. The examples of multi-wall carbon nanotubes ("MWCNT") in HXNBR were conventionally mixed in an internal mixer and two-roll mill. The resulting compositions showed an increase in modulus and strength but essentially the same elongation.

Reference is made to Applicant's co-pending U.S. patent application Ser. No. 14/243,634 filed Apr. 2, 2014, titled Method for Rubber Reinforced With Carbon Nanotubes.

SUMMARY

The present invention is directed to improved methods of dispersing carbon nanostructures, such as nanotubes, in elastomers through the formation of preblend compositions containing carbon nanostructures and the resulting elastomer compositions and articles made therefrom.

By suspending or dissolving the CNT, or other carbon nanostructured material, in a solvent and blending with carrier particles such as carbon black followed by drying, it is possible to disperse the CNT in and around the carrier particles, or to disperse the carrier particles throughout the CNT network. It has been discovered that such a preblend helps the CNT disperse in rubber, especially nonpolar elastomers such as ethylene-alpha-olefin elastomers. As a result, improvements in modulus, elongation and tear can be realized. The fact that the CNT can increase modulus while simultaneously increasing elongation at break and tear properties is believed to be a new and advantageous result. The use of carbon black as the carrier particulate solid may be readily incorporated into existing rubber processes and may be cost effective.

The invention is directed to a method including the steps of forming a carbon preblend by dispersing carbon nanostructures in a liquid medium, mixing with a particulate solid, such as carbon black, and drying to remove the liquid, resulting in a preblend of nanostructures and the particles, for example a preblend of CNT and carbon black. The preblend may then be dispersed in a polymer matrix, such as an elastomer matrix. The invention is also directed to the resulting polymer or elastomer or rubber composition and to articles made from the composition, such as tires, power transmission belts, transport belting, or hose.

The inventive method may include suspending or dissolving both CNT and carrier particles such as carbon black in a solvent, mixing and finally drying them. The inventive method can lead to inventive CNT-coated particles or particles coated with other carbon nanostructured materials to form a preblend Depending on dimensions and amounts of both the CNT and the carrier particles, instead of CNT-coated particles, a structure consisting of a CNT network in which particles are dispersed can be formed.

A CNT/carbon black preblend may provide particularly improved dispersion of single-wall carbon nanotubes ("SW-CNT") in an ethylene-alpha-olefin rubber composition, resulting in improved reinforcement from the SWCNT.

The amount of CNT or other nanostructured carbon in the elastomer compositions of the invention may be from 0.5, 1, or 2 weight % up to 2, 3, 4, or 5 weight %. The amount of CNT in the preblend may be from 1%, or 5%, or 7% up to about 20%, or up to 30%, or up to 50% by weight based on the weight of the preblend.

The inventive elastomer compositions may be formed into useful rubber articles, such as tires, belts, hose, or vibration control components. Power transmission belts include V-belts, multi-v-ribbed belts, synchronous belts, flat belts, and the like, without limit.

The improved elastomer compositions containing some amount of the CNT preblend may show simultaneous improvement in both modulus and in elongation at break. The compositions may also show improvements in tear strength, cut or crack growth rates and fatigue resistance.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention.

DETAILED DESCRIPTION

Figure 1:
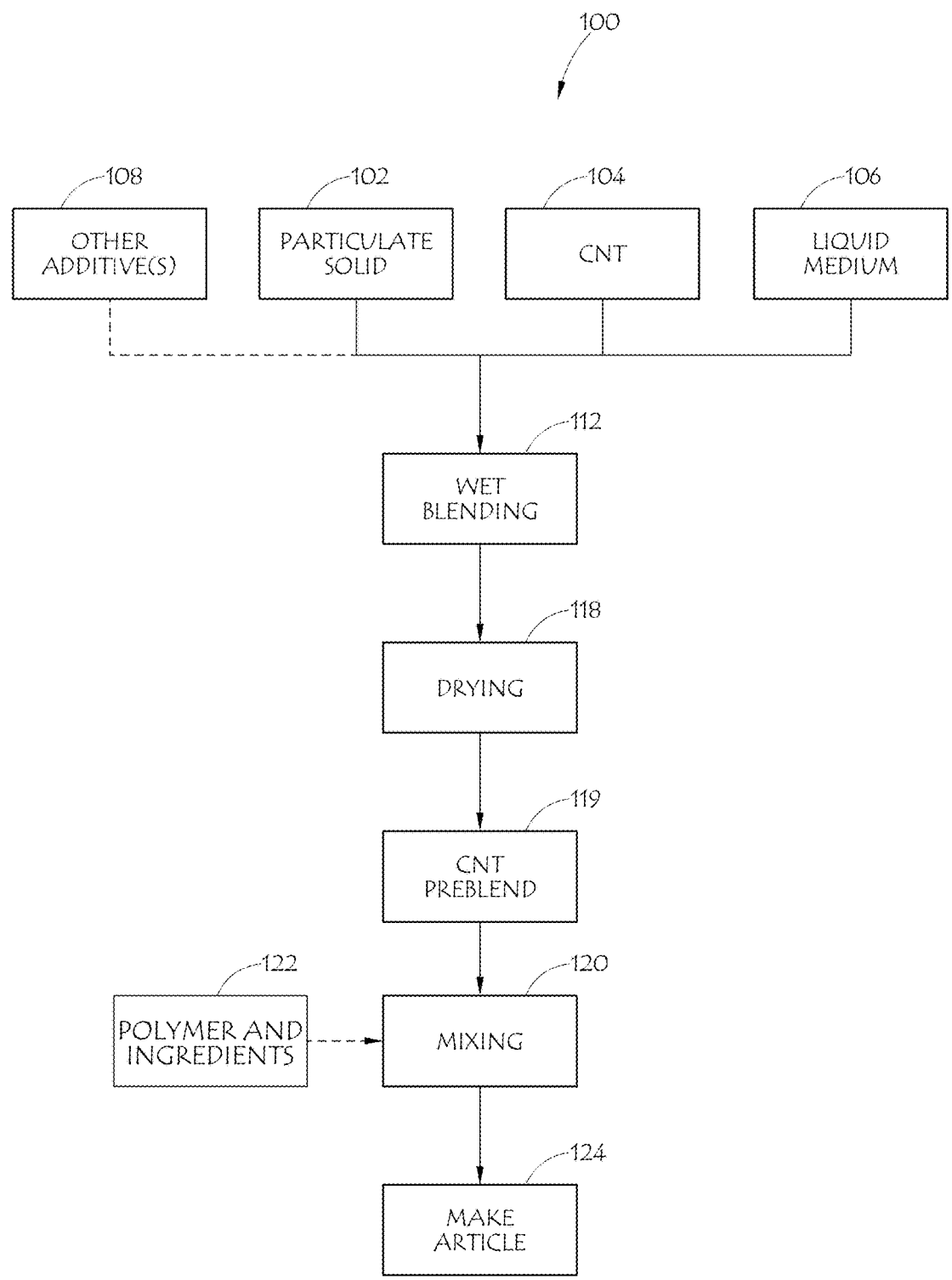
FIG. 1 is a flow chart of an embodiment of the inventive method.

The methods and elastomer compositions according to the invention include a method for forming a preblend of carbon nanostructures, such as CNT, with a particulate solid, such as carbon black and further methods for the dispersion of the preblends in elastomers. Carbon nanostructures are carbon-based materials in which at least one dimension is on the order of less than one to several nanometers. They include but are not limited to structured nanocarbons such as single-walled, double-walled, few-walled or multi-walled carbon nanotubes, graphene, few-walled graphenes, graphene oxides, fullerenic and forms of structured carbons and their chemical derivatives. They include fullerene molecules such as C60, C70, C84, etc., and fullerene molecules containing another atom or atoms inside or outside the fullerene cage or one or more functional groups. Other carbon nanostructures include spheroids or spherules of carbon made up of curved carbon sheets or layers which have substantial fullerenic character. Fullerenic character is noted by the presence among six-member and sometimes seven member rings of five-membered carbon rings which result in curved sheets of carbon. Chemical derivatives of carbon nanostructures include any of the carbon-based materials described above that are functionalized, i.e. have added groups, e.g. by addition reactions. Also, carbon nanostructures include structured fragments of any of the structured nanocarbons described above. A preblend is a mixture of materials made in advance of another mixing process, e.g. a rubber composition mixing process. The preblend is accordingly mixed into an elastomer together with other desired ingredients to make an elastomer composition suitable for molding useful elastomeric articles. FIG. 1 shows a flow chart of the method according to an embodiment of the invention. Preblends are also sometimes referred to as "predispersions" or simply "blends."

In FIG. 1, method 100 includes the steps of blending 112, mixing 120, and making an article 124. The blending step 112 includes as inputs carrier particles 102 such as carbon black, carbon nanotubes 104, carrier liquid medium 106 and optionally other additives 105. The wet blending 112 step may include various orders of addition and/or mixing. In one preferred embodiment, CNT 104 is dispersed in liquid medium 106 first, followed by addition of particulate solid 102. In another embodiment, CNT 104 and particulate solid 106 are each dispersed in separate liquid media 106, and then the two dispersions are combined. The wet blending 112 is followed by drying 118. After the blending and drying steps, the resulting CNT preblend 119 may be introduced into mixing step 120 along with desired polymer or rubber ingredients 122 to obtain a rubber compound suitable for making article 124. Mixing step 120 may optionally include multiple mixing process steps and/or multiple ingredient additions. In other embodiments, CNT in FIG. 1 may be replaced by some other carbon nanostructure as defined above or mixtures thereof.

The carbon nanotubes (CNT) are very strong molecular fibers with small dimensions across the fiber and reasonably large L/D ratios. Several synthetic methods are possible, with chemical vapor deposition (CVD), electric arc discharge (EAD) and combustion, as disclosed, e.g., in U.S. Pat. Nos. 7,887,775 and 7,396,520, among the more common methods used. The dimensions depend on the manufacturing process. Single-walled carbon nanotubes (SWCNT) may range from 0.5 to 6 nanometers (nm) in diameter have lengths ranging from 0.1 to 5 microns (μm) in length, preferably 0.5 to 5 μm in length. A single-wall carbon nanotube is formed from a single graphene sheet folded into a cylinder. Multi-walled carbon nanotubes (MWCNT) range from 2 to 110 nm in diameter and from 0.1 to 1000 μm, preferably from 0.1 to 50 μm in length, and consist of multiple layers of graphene rolled up on themselves to form a tube shape. These dimensional variations depend on the process and manufacturer. Either single-wall carbon nanotubes or multi-wall carbon nanotubes may be used in the inventive methods and compositions, but single-wall carbon nanotubes are preferred.

The carbon nanotube preblend comprises carbon nanotubes and a particulate solid such as carbon black. Particulate solids of particular usefulness are those commonly used as reinforcing fillers or non-reinforcing fillers in polymer or elastomer compositions, including silica, carbon black, clay, whiting, various metal oxides and hydroxides, and the like. Carbon black is preferred because of its widespread use in rubber and its chemical compatibility with carbon nanotubes. Types of carbon black suitable for use in the present method include those identified in ASTM D1765. Two suitable examples, as will be seen below, include N550 and N220.

The amount of CNT in the preblend may be from 1%, or 5%, or 7% up to about 50%, or up to 30%, or up to 20% by weight based on the weight of the preblend. The amount of CNT in the preblend may be expressed as a ratio of particles to carbon nanotubes, and the ratio may be from about 4:1 to 99:1 or to 20:1 by weight, or from 6:1 to 15:1, or about 9:1 to about 14:1. The CNT may be readily blended with carbon black according to the methods described herein, and a CNT/carbon black preblend is very compatible with ethylene-alpha-olefin elastomers such as EPDM.

The term "carrier liquid" or "liquid medium" refers to a liquid in which carbon nanotubes may be dissolved, dispersed or suspended. The carrier liquid may be removed by evaporation or drying, leaving the nanotubes coated on or intermixed with the carbon black. Suitable carrier liquids include water or organic solvents including alcohols, chlorinated aliphatic or aromatic solvents, ketones, other oxygen-containing or halogen-containing hydrocarbon liquids. substituted aromatic molecules, alkyl substituted aromatics, halogenated substituted molecules, halogenated alkanes, partially hydrogenated aromatics, alkylamines, cyclic ethers, o-dichlorobenzene, toluene, xylene, benzene, dimethylformamide ("DMF"), ethylene chloride, chloroform, 1,2,4-trimethylbenzene, 1,2,3,4-tetramethylbenzene, tetrahydrofuran, 1,2-dibromobenzene, 1,1,2,2-tetrachloroethane, 1,2,3,4-tetrahydronapthalene, octadecylamine, acetone. Other liquids which can be used include systems based, e.g., on water stabilized by means of surfactant with such surfactant being at least one member selected from the group consisting of sodium cholate, ("NaDDBS"; $C_{12}H_{25}C_6H_4SO_3Na$), sodium octylbenzene sulfonate (NaOBS; $C_8H_{17}C_6H_4SO_3Na$), sodium butylbenzene sulfonate ("NaBBS"; $C_4H_9C_6H_4SO_3Na$), sodium benzoate ($C_6H_5CO_2Na$), sodium dodecyl sulfate ("SDS"; $CH_3(CH_2)_{11}$—$OSO_3Na$), Triton (trademark of Dow Chemical Co.) X-100 ("TX100"; $C_8H_{17}C_6H_4(OCH_2CH_2)_nOH$; n~10), dodecyltrimethylammonium bromide ("DTAB"; $CH_3(CH_2)_{11}N(CH_3)_3Br$), dextrin, and polystyrene-polyethylene oxide diblock copolymer ("PS-PEO"). Other non-ionic dispersal aids such as outlined, e.g., in International Appl. No. PCT/US2010/045391 and U.S. patent application Ser. No. 13/725,080, can be used in water or solvent-based systems. Temperature adjustments can also be used in water or solvent-based systems in order to enhance the dispersion or solution properties. Two suitable examples, as will be seen below, include ethanol and o-dichlorobenzene.

The term polymer includes thermoplastic, elastomeric and thermoset polymeric materials. The terms rubber and elastomer may be used somewhat interchangeably, but rubber generally implies a crosslinked elastomer material, while some elastomers may in general be thermoplastic or may be crosslinked. The terms "rubber" and "elastomer" are used herein to refer to the elastomeric or rubbery polymer which forms a primary elastomeric constituent of an elastomeric or rubbery material, while the terms "rubber composition" and "elastomer composition" are used to refer to a mixture of a primary elastomeric constituent with one or more other compounding ingredients, such as fillers, fibers, antidegradants, process aids, curatives, cure accelerators, coagents, softeners, extenders, and the like. Any suitable elastomer may be used, including without limit, natural rubber (NR), epoxidized natural rubber (ENR), isoprene rubber (IR), styrene-butadiene rubber (SBR), nitrile rubber (NBR), hydrogenated nitrile (HNBR), chloroprene rubber (CR), ethylene-α-olefin elastomers such as ethylene propylene rubber (EPM or EPDM), ethylene butene (EBM) or ethylene octene (EOM), butyl rubber (IIR), chlorobutyl rubber (CIIR), acrylic rubber (ACM), silicone rubber (Q), fluorine rubber (FKM), butadiene rubber (BR), epoxidized butadiene rubber (EBR), epichlorohydrin rubber (ECO), cast urethane elastomers (PU), or polysulfide rubber (T); a thermoplastic elastomer such as an olefin-based elastomer (TPO), a polyvinyl chloride-based elastomer (TPVC), a polyester-based elastomer (TPEE), a polyurethane-based elastomer (TPU), a polyamide-based elastomer (TPEA), or a styrene-based elastomer (SBS), and the like. A mixture of these elastomers may be used. Embodiments of the method are particularly useful for ethylene-α-olefin elastomers including difficult-to-disperse, non-polar elastomers such as EPM or EPDM, EBM, or EOM.

The method of making the CNT/carbon black preblend is to wet mix them in a suitable liquid. The mixing may be carried out in or with any suitable mixer, whether batch-wise or continuous, such as, for example, internal mixers, ribbon-blade batch mixers, high-shear batch mixers, single-screw extruders, and twin-screw extruders. The mixture may then be dried using any suitable drying equipment, whether batch-wise or continuous, such as for example, spray dryers, vacuum dryers, tray dryers, drum dryers, conveyor dryers, and the like. Filtering may be included in the drying processing to concentrate the solids.

The preblended carbon nanostructures in preblend form may be added to a polymer or an elastomer composition according to known methods of compounding polymers, rubber and elastomers. For example, the rubber and its various ingredients may be compounded with the preblend using an internal batch mixer, a single-screw extruder, a twin-screw extruder, two-roll mill, or the like. The various ingredients may be added in stages, or all at once. Preferably, the compound is mixed in multiple stages if in a batch mixer.

The preblended carbon nanostructures comprising, e.g., carbon nanotubes, carbon black, graphitic carbon particles and or glassy carbon particles can also be used in many other applications besides the incorporation of such a preblend in an elastomer or other polymer. Such extended applications include among others, use of the preblends in battery electrodes, in particular lithium battery electrodes, battery electrolyte compositions, and in super capacitors.

The carbon preblend described above can be used as a conductive material in a secondary battery as part of a battery electrode in various proportions with an active material and a binder. Examples of common active materials that can be used in combination with the carbon preblend are $LiCoO_2$, $LiNiO_2$, $LiFeO_2$, $LiMnO_2$, $LiVO_2$, or a combination where a given transition metal ion (Co, Ni, Fe, Mn and V) is partially substituted by other transition metal ions.

Without being limited by the choice of binders, common binders that can be considered include polytetrafluoroethylene, polyvinylidene fluoride, polyethylene, polypropylene and synthetic rubbers among others.

For mixing of the dry form of carbon preblend with other kinds of conductive, active, or electrolytic materials, for use for example in battery electrolyte compositions, a wide range of solvents can be used. For example, propylene carbonate, ethylene carbonate, butylene carbonate, diethyl carbonate, dimethyl carbonate, methyl ethyl carbonate and acetonitrile can be used alone or in combination with other solvents to form a slurry.

A thick film electrode can be formed on flexible polymeric substrates or paper using a range of deposition techniques comprising doctor blade coating, printing, rod coating or spray coating.

Taking advantage of the large surface area of CNT, the carbon preblend of the subject invention can also be used, for instance, as part of electrical double layer capacitors (commonly known as super capacitors), including use as electrolyte in combination with other forms of carbons, conductive materials, electrolytes, solvents and salts. One illustrative example of an electrolyte which might be used with the carbon preblend is acetonitrile used alone or in combination with a salt such as tetraethylammonium tetrafluoroborate $(C_2H_5)_4NBF_4$.

As another example of use of the preblend form of carbon described throughout this specification in various details, the preblend composition can be applied on to various substrates in the form of a paint, coating, or slurry, or used as a component of a paint, coating, or slurry.

Examples

In the first example, a preblend including N550 carbon black and SWCNT is prepared to evaluate whether preblends of CNT can subsequently assist in the dispersion of the CNT in EPDM elastomer compositions. Single-walled carbon nanotubes (SWCNT) were provided by Nano-C, Inc. of Westwood, Mass. As for the dimensions of the SWCNT, the diameter ranges from 0.8 to 1.9 nm with a higher abundance between 0.8 and 1.3 nm. Regarding the SWCNT bundle length, it ranges from 0.4 to 2 micrometer, most abundant from 0.5 to 1 micrometer. All other ingredients mentioned herein were obtained from commercial distributors and used as provided.

A first example blend of the single-walled carbon nanotubes with N550 carbon black had a SWCNT content of 7.18% by weight, or 13:1 ratio of carbon black to CNT. This blend was prepared by first mixing the SWCNT in ethanol (1 gram of SWCNT in 35 ml of ethanol) and sonicating for 15 minutes. Also, carbon black was dispersed in ethanol at a about 30 gm/l and mixed with an IKA T25 disperser (sold under the IKA trademark by IKA Works Inc.) for 15 minutes. The CNT solution was then added to an appropriate amount of carbon black solution and mixed with the IKA T25 disperser for 15 more minutes. The solvent was then removed by filtration and the carbon preblend material isolated and dried in a 60° C. oven overnight. This material was then characterized assessing the degree of homogeneity and the identity of the resulting product.

Figure 2:
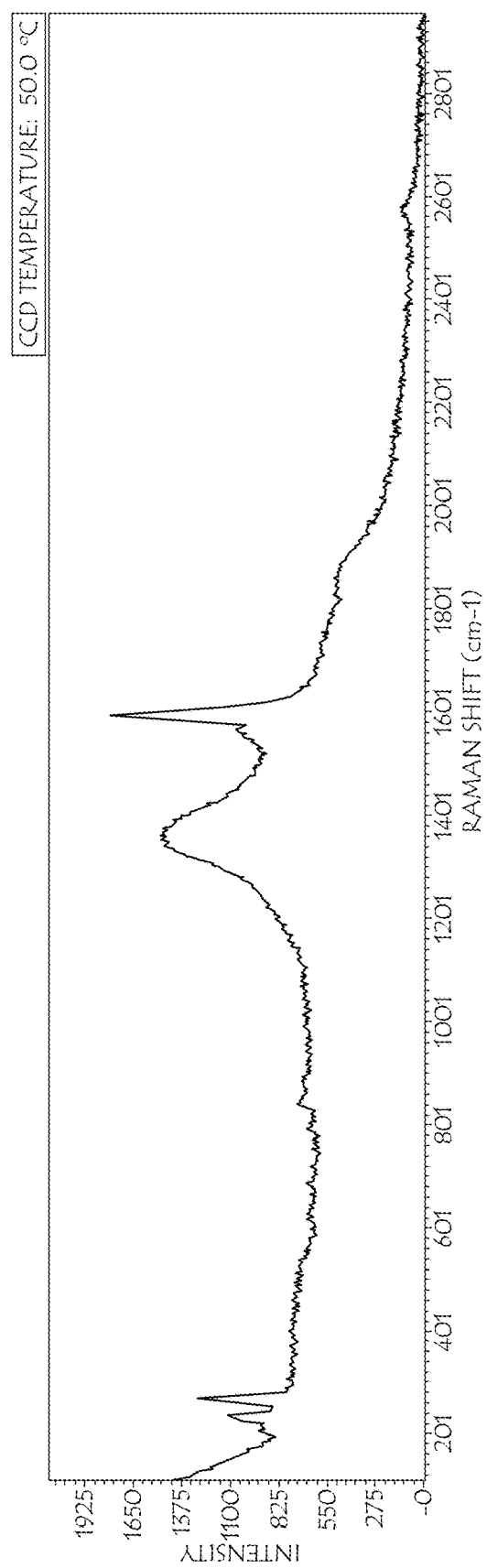
FIG. 2 is a Raman spectrum measured at 785 nm of preblend material consisting of N550 carbon black and SWCNT in a 13:1 ratio mixed in ethanol.
Figure 3B:
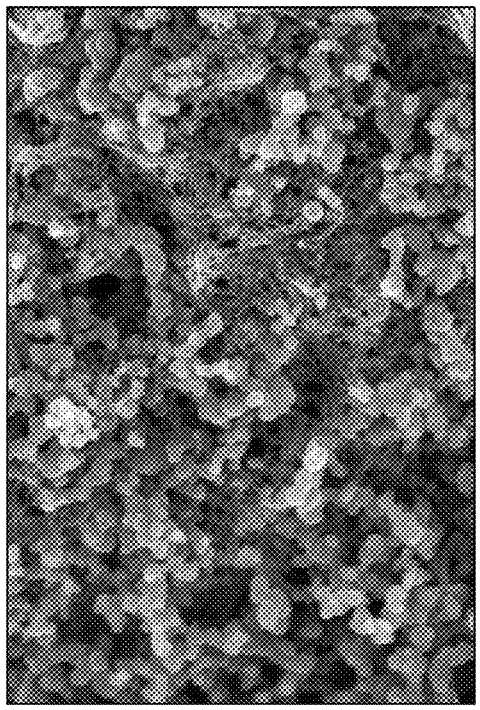
FIG. 3B is an SEM of the material of FIG. 3A magnified by: ×35,000.
Figure 3D:
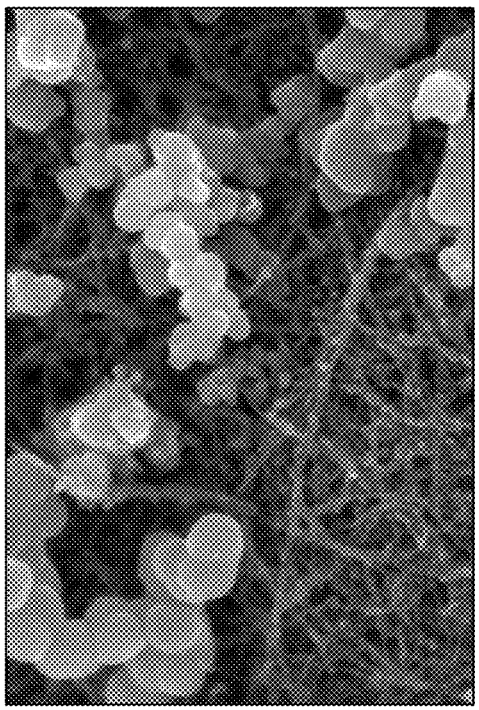
FIG. 3D is another SEM of the material of FIG. 3A magnified by: ×120,000 according to an embodiment of the invention.
Figure 3A:
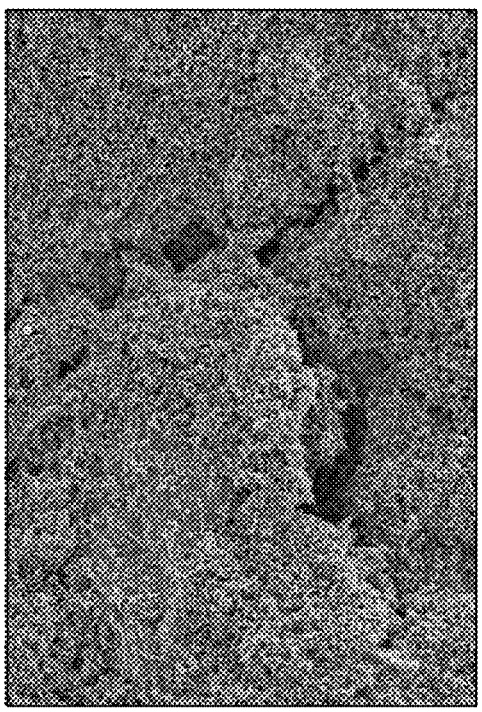
FIG. 3A is a Scanning Electron Microscopy (SEM) image of preblend material consisting of N550 carbon black and SWCNT in a 13:1 ratio mixed in ethanol followed by filtration and drying overnight at 60° C. magnified by: ×2,500.
Figure 3C:
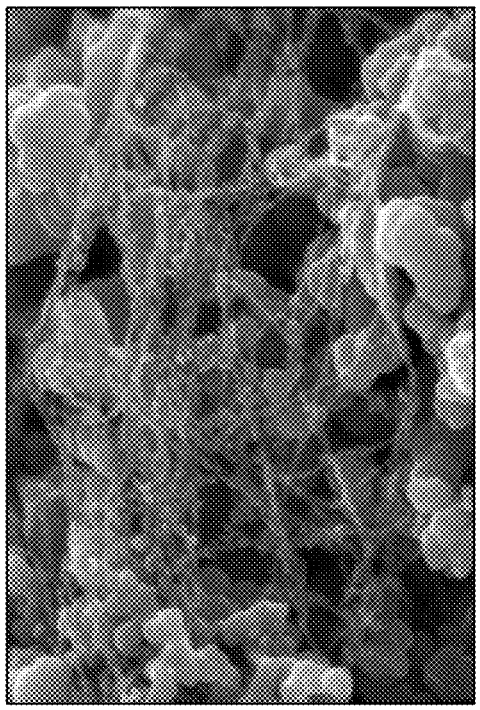
FIG. 3C is an SEM of the material of FIG. 3A magnified by: ×120,000.

Raman Spectroscopy results (as shown in FIG. 2) demonstrate the presence of both of the ingredients in the blend and show very little modification in the peaks for each material. RBM- ($\approx$200 to 300 $cm^{-1}$) and G- (around 1600 $cm^{-1}$) modes stem from the SWCNT, whereas the D-band ($\approx$4300 to 1400 $cm^{-1}$) reflects the presence of carbon black. As this observation alone only shows the blend contains both materials but not the detailed morphology, the blend was subsequently examined by SEM microscopy. SEM pictures of preblend material consisting of N550 carbon black and SWCNT in a 13:1 ratio are shown in FIG. 3 including magnifications of: (FIG. 3A) 2500×, (FIG. 3B) 35,000×, and (FIG. 3C) and (FIG. 3D) 120,000×. FIG. 3A-3D shows a preblend material with unique morphology in which both constituent materials became intimately mixed. As the carbon black particles, used here, are much bigger than the width of the nanotubes, the new material consists of nanotube network(s) surrounding carbon black particles, or, in other words, of a nanotube network with carbon black particles dispersed therein. Evidence is found that this unique preblend structure provides improvements in subsequent dispersion of the nanotubes in an elastomer composition.

Other carbon-based particles consisting of graphitic, glassy or structure-less carbon can be used as the carrier particulate solid or mixtures thereof, instead of or in addition to carbon black. Particle shape of the carrier can be regular or irregular.

Other fullerenic or nanostructured carbon materials such as spheroidal fullerenes ($C_{60}$, $C_{70}$, ..., $C_{84}$, ...), graphenes, functionalized or not, can be used instead of carbon nanotubes.

When the carbon-based carrier particles are larger than both the width and length of the material with which they are mixed, a unique core-shell material in which nanotubes or other fullerenic materials ("the shell") cover the surface of the graphitic, glassy or structure-less "core." Coverage may be up to 50% or 50 to 100%.

The diameter of the carbon-based or other particulate core material can be between 20 nm and 20 µm while the longest dimension of the nanocarbon shell material can be between 0.7 nm and 2.0 µm.

Figure 4:
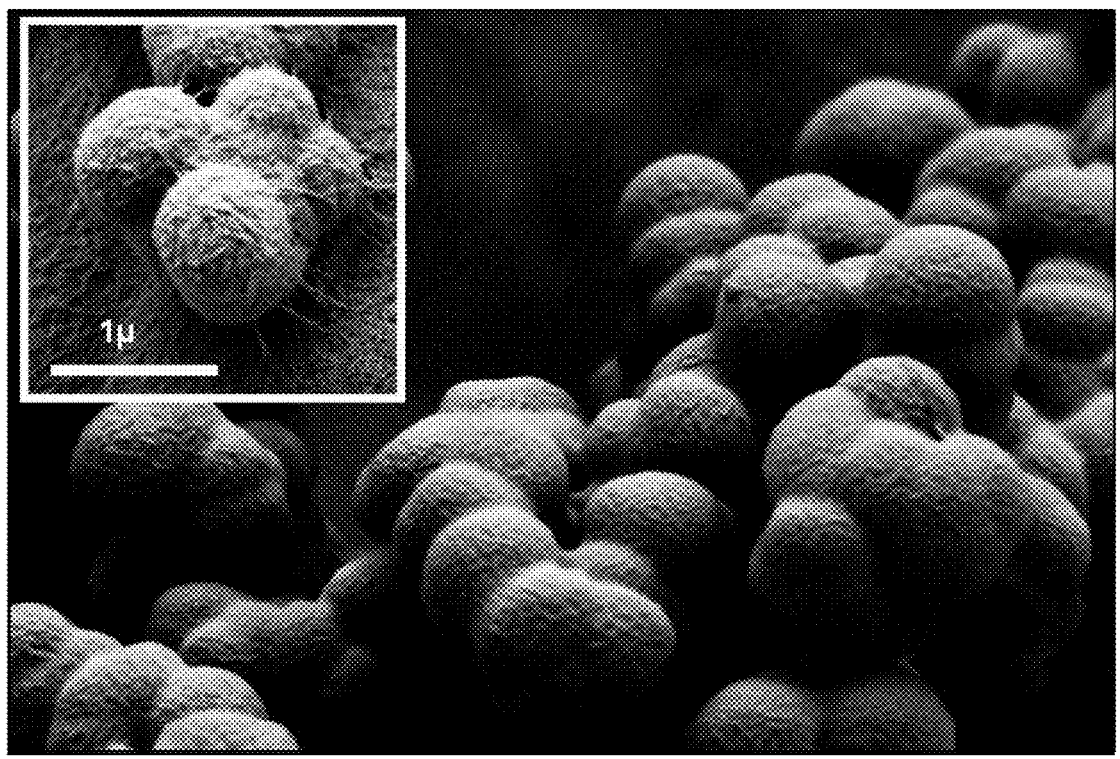
FIG. 4 is an SEM of polymer beads coated with single-walled carbon nanotubes according to an embodiment of the invention.

An illustration of a core covered with carbon nanotubes as the shell is given in FIG. 4 in which polymer beads with diameters of approximately 1 µm coated with single-walled carbon nanotubes are shown.

One final analysis of the preblended material was a measurement of the resistivity of the blend. The resistivity of the bulk materials was checked and the preblend was nearly as conductive as the pure nanotubes themselves, in spite of the low level of nanotubes in the preblend. This surprising result indicates the nanotube network may be expanded by the interspersed larger carbon black particles without breaking the network.

The rubber compounding herein utilized a conventional B-Banbury lab mixer with 1571 ml internal volume. In a first series of rubber compounding examples, shown in Table 1, the control elastomer composition was 100 parts by weight Vistalon 706 (EPM) sold under that trade named by Exxon Chemicals; with 60 parts per hundred parts of elastomer ("phr") of N550 carbon black, and 5 phr of peroxide curative (Vul-Cup 40KE). The composition also included 0.3 phr of a retarder and 1 phr of an antioxidant. This composition (Comp. Ex. 1) was mixed as the control example (i.e., with no CNT). A second comparative example (Comp. Ex. 2) was mixed with 50 phr N550 and 3.87 phr of CNT, added into the mixer together, but not as a preblend. Inventive example (Ex. 3) was mixed using 53.87 phr of the aforementioned 7.18% preblend of SWCNT and carbon black resulting in a CNT loading of 1.25 volume %. Cure studies were run on a standard rubber moving die rheometer ("MDR") at 170° C.

(per ASTM D-5289). Tensile tests were carried out at room temperature and 125° C. per ASTM D-412. Reported results include the "10% modulus" which is the stress at 10% strain in N/mm$^2$. Tests are at room temperature ("RT") and in the with-grain ("w/g") direction unless otherwise indicated. Cross-grain tests are indicated as "x/g". The formulations and results are shown in Table 1. It can be seen that mixing the SWCNT into the rubber composition produces the following results.

The MDR maximum torque observed at 170° C. (MH) was lower for both the samples with carbon black and nanotubes. At the same time, the minimum torque (ML) at this temperature was higher for the two samples with nanotubes than the control. The cure rate information on these compounds is indicated by t90 in Table 1. The cure times for the compounds with nanotubes were significantly less than those of the control compound. This trend is consistent with that seen for the wax/carbon nanotubes dispersion evaluated previously in U.S. patent application Ser. No. 14/243,634.

The Mooney viscosity (ML/132° C.) for these compounds (at a lower temperature than the MDR) showed a small increase with the addition of the carbon nanotubes. There is essentially no difference in the viscosity for either route of incorporation of the nanotubes.

The dynamic modulus of the two compounds with nanotubes was determined at 175° C. on the Rubber Process Analyzer (RPA) according to ASTM D-6601. Table 1 shows the same lower modulus (G') for the nanotubes-containing compounds seen with the MDR. Here, when the nanotubes were pre-blended with carbon black, the resulting material was slightly stiffer than simple addition of the two materials separately. This is an indication of some improvement in nanotubes dispersion using the carbon black/nanotubes blend. The small increase in modulus observed with pre-blending the two materials is accompanied by an increase in hysteresis (tan δ), but only up to the level of the control.

Room temperature 10% modulus shows an increase in modulus with the introduction of nanotubes into the compound and this is further increased with the pre-blending of the two materials prior to compounding. The largest increase in each case is in the with-grain direction and very slight in the cross-grain direction. At elevated temperature, the increase in modulus is marginal, following the trend indicated by the RPA and MDR data. There is no significant decline in modulus over the control at high temperature, as was seen in previous studies of wax/CNT predispersions. Thus, the method of preblending CNT with carbon black provides more temperature stability than another method.

Elongation at break shows a noticeable increase with introduction of CNT in the compound and an additional increase when the CNT are pre-blended with carbon black. This trend is consistent with or across the grain of orientation from processing. At elevated temperature (125° C.), the trend is the same but the increases are all smaller than at RT. Toughness is also improved by CNT.

Tear properties (die-C tear strength according to ASTM D-624) show a steady increase with the addition of the CNT and further increase with the pre-blending. Also, anisotropy is increased slightly with the introduction of the CNT. Tear also is slightly increased over the control at increased temperature.

The Shore A hardness for these compounds is essentially the same.

The DeMattia test was carried out in accordance with ASTM D-813 with a pierced specimen. The cut growth rate is reported as the extrapolated number of mega-cycles to reach a 1-inch cut width, i.e., Mcycles/in. DeMattia crack growth rates showed a marked improvement regardless of the orientation, if any, of the CNT in the compound. This was evaluated at 125° C., and the improvement occurs in spite of the fact that there is some increase in stiffness of the compound.

The electrical properties of the compounds were evaluated using a two-probe unit. Both samples with the CNT in the compound showed improved conductivity, but there was no differentiation between the two samples.

Figure 5:
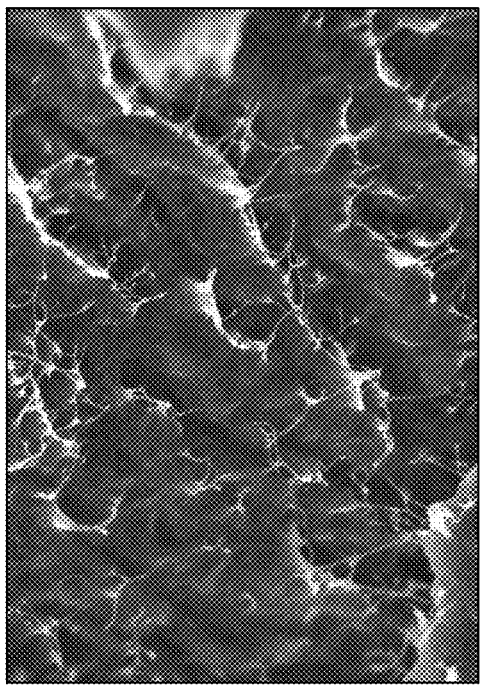
FIG. 5 is an FE-SEM image of a control rubber compound with a magnification of ×35,000, with carbon black only added to rubber.
Figure 6:
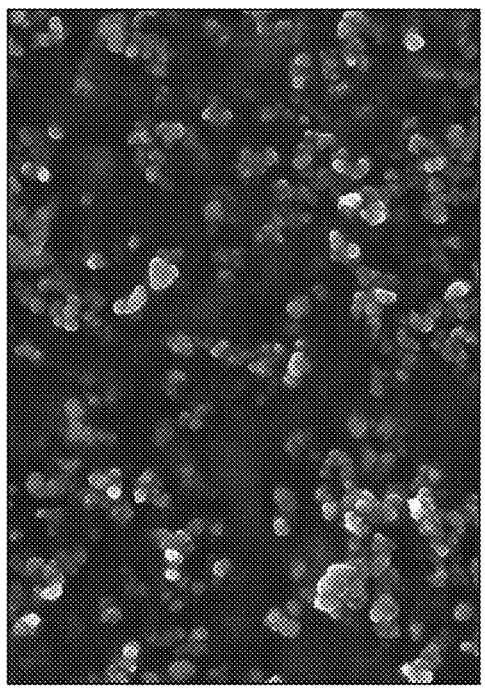
FIG. 6 is an FE-SEM image of a control rubber compound with a magnification of ×35,000 made by separate addition to rubber of N550 carbon black and SWCNT.
Figure 7:
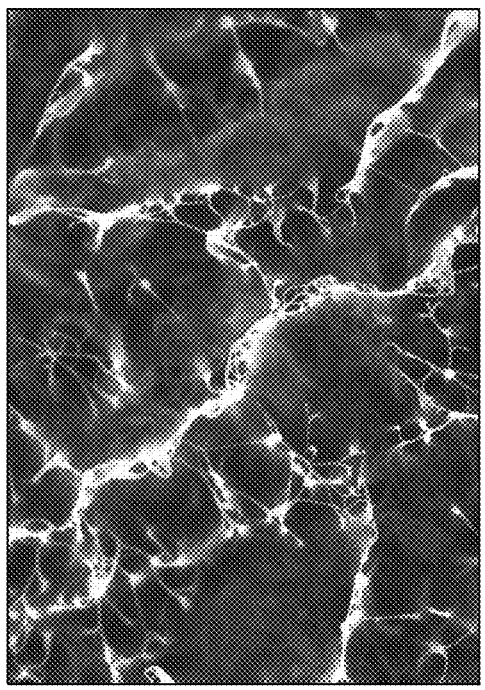
FIG. 7 is an FE-SEM image of a rubber compound with a magnification of ×35,000 with N550 carbon black/SWCNT preblend wet-mixed in ethanol and added to rubber according to an embodiment of the invention.

Finally, Field-emission SEM (FE-SEM) photomicrographs were taken of the rubber samples for this series. FIGS. 5-7 show FE-SEM pictures at 30,000× of three rubber compounds: FIG. 5 shows a control, carbon black only added to rubber; FIG. 6 shows separate addition to rubber of carbon black and SWCNT; and FIG. 7 shows carbon black/SWCNT preblend prepared in liquid at Nano-C and added to rubber. The sample (FIG. 5) with carbon black-only shows carbon black on the surface. The two samples with the CNT (FIGS. 6-7) show the carbon nanotubes interacting with the rubber and generating a web-like surface feature. On the basis of these photographs, it is believed the dispersion of the nanotubes was better for the Ex. 3 material than for Comp. Ex. 2.

The examples show that CNT preblended with carbon black can improve rubber physical properties such as elongation at break, modulus, crack growth resistance and conductivity while other properties are unaffected or slightly improved.

TABLE 1

|  | Comp. Ex. 1 | Comp. Ex. 2 | Ex. 3 |
|---|---|---|---|
| EPM | 100 | 100 | 100 |
| Carbon Black[1] | 60 | 50 | 0 |
| ZDMA Coagent | 15 | 15 | 15 |
| Paraffin Oil | 10 | 10 | 10 |
| Antioxidant | 1 | 1 | 1 |
| SWCNT | — | 3.87 | — |
| CB/SWCNT Preblend | — | — | 53.87 |
| Retarder | 0.3 | 0.3 | 0.3 |
| Peroxide (40KE) | 5 | 5 | 5 |
| SWCNT (vol. %) | 0 | 1.25 | 1.25 |
| MDR-ML (lb-in) | 1.99 | 2.16 | 2.42 |
| MDR-MH (lb-in) | 31.2 | 26.7 | 27.8 |
| MDR-t90 (min) | 10.89 | 7.4 | 7.69 |
| MV/132° C. (mu) | 68.8 | 74.0 | 74.0 |
| RPA-G' (kPa)[2] | 3867 | 2970 | 3405 |
| RPA-tan δ[2] | 0.142 | 0.082 | 0.145 |
| % Elong. at Break (RT) | 296 | 390 | 403 |
| 10% Modulus (psi) (RT) | 190.9 | 210.3 | 220.0 |
| Toughness (RT) | 4328 | 5361 | 5886 |
| Shore A Hardness | 78 | 78 | 78 |
| % Elong 125° C. | 168.8 | 209.7 | 234.6 |
| 10% Mod. 125° C. (psi) | 130.2 | 137.3 | 137.2 |
| Toughness 125° C | 987 | 1126 | 1380 |
| DeMattia 125° C. (Mcycle/in) | 3.3 | 1250 | 1167 |
| C-Tear x/g (lb/in) (RT) | 290.1 | 373.8 | 391.5 |
| C-Tear w/g (lb/in) (RT) | 292.9 | 358.7 | 371.3 |

[1]N550;
[2]1000 CPM, 0.18° strain, 175° C.

Figure 8:
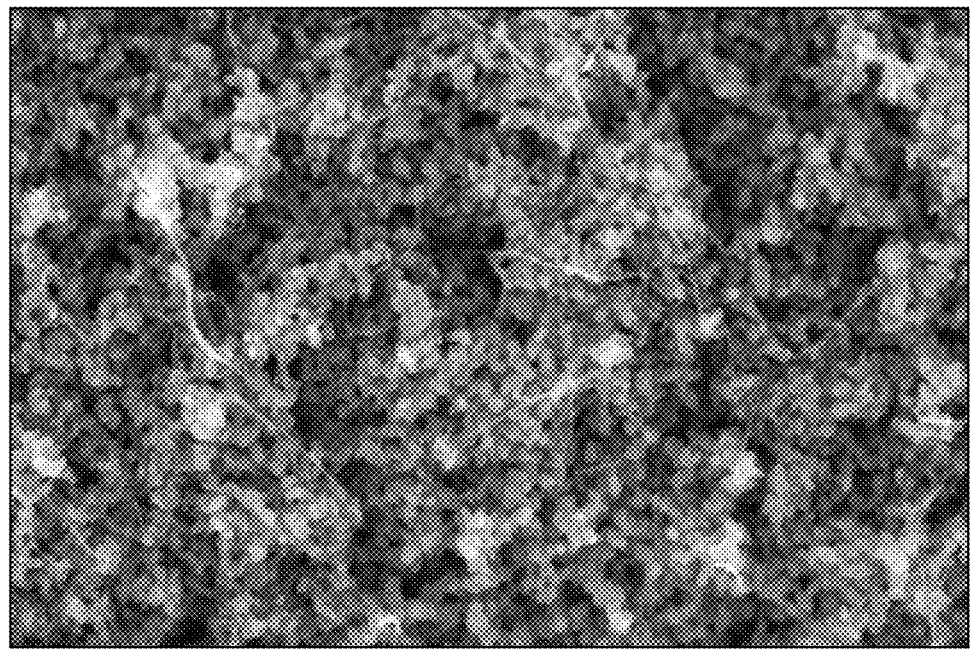
FIG. 8 is an SEM image of a carbon black/SWCNT preblend prepared by mixing in o-dichlorobenzene: N220 carbon black/SWCNT (5:1), magnified ×40,000.
Figure 9:
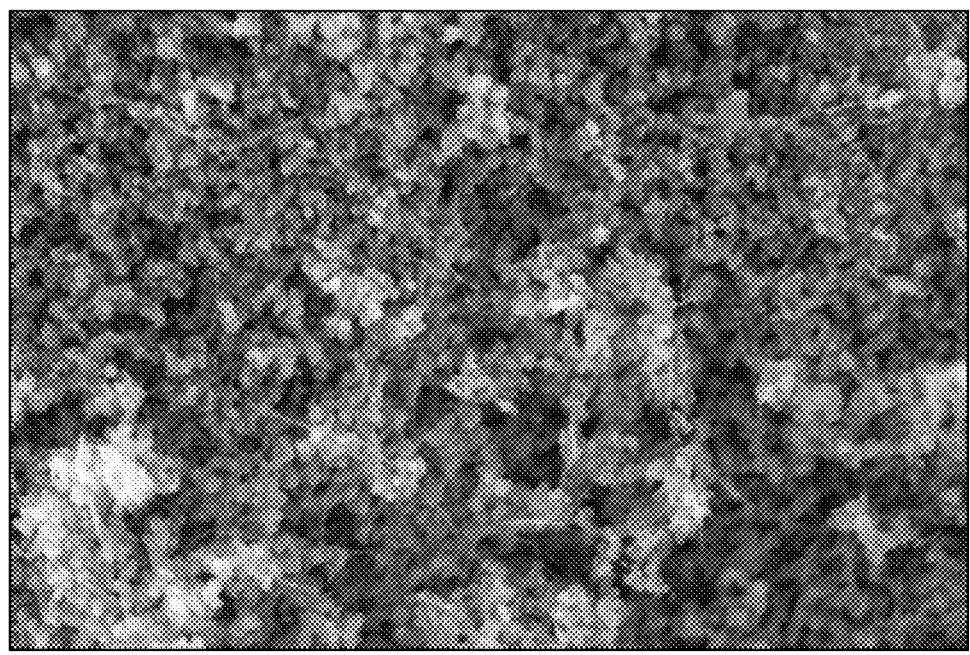
FIG. 9 is an SEM image of a carbon black/SWCNT preblend prepared by mixing in o-dichlorobenzene: N220 carbon black/SWCNT (7:1), magnified ×40,000.
Figure 10A:
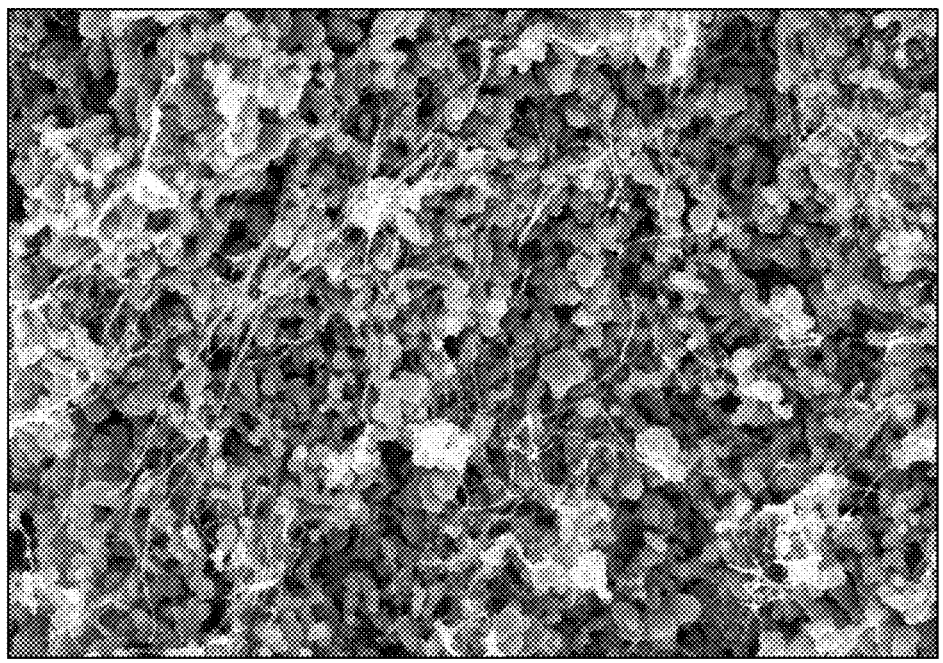
FIG. 10A is an SEM image of a carbon black/SWCNT preblend prepared by mixing in o-dichlorobenzene: N550 carbon black/SWCNT (5:1): magnified ×25,000.
Figure 10B:
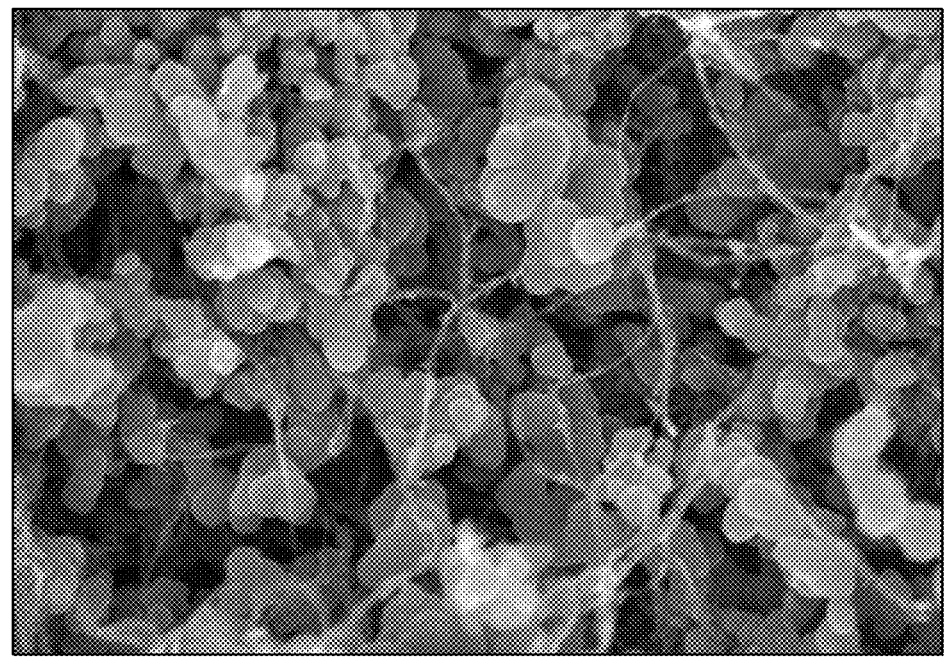
FIG. 10B is an SEM image of the preblend of FIG. 10A magnified ×70,000.
Figure 11A:
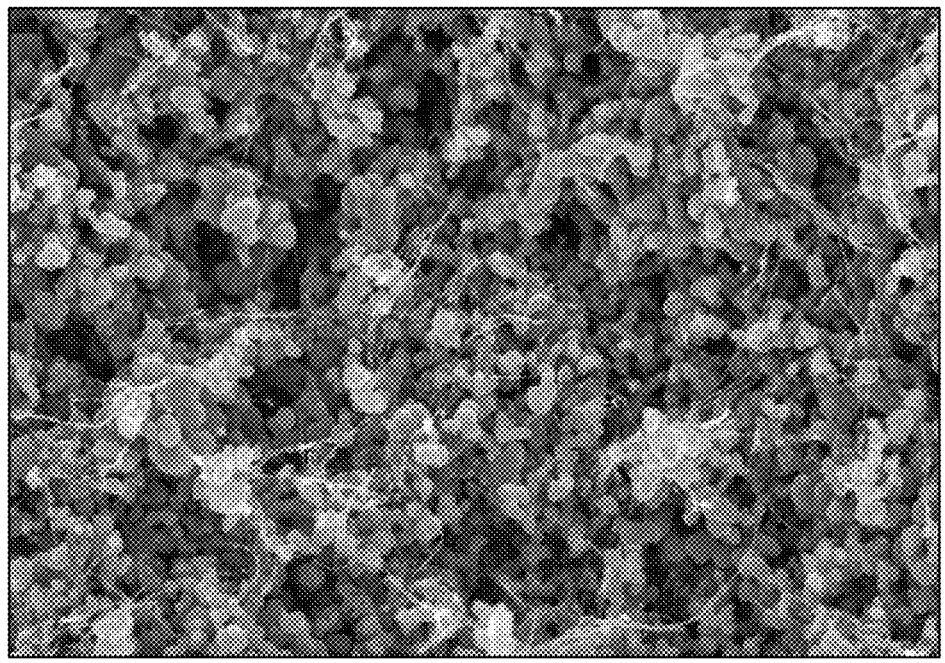
FIG. 11A is an SEM image of a carbon black/SWCNT preblend prepared by mixing in o-dichlorobenzene: N550 carbon black/SWCNT (7:1): magnified ×25,000.
Figure 11B:
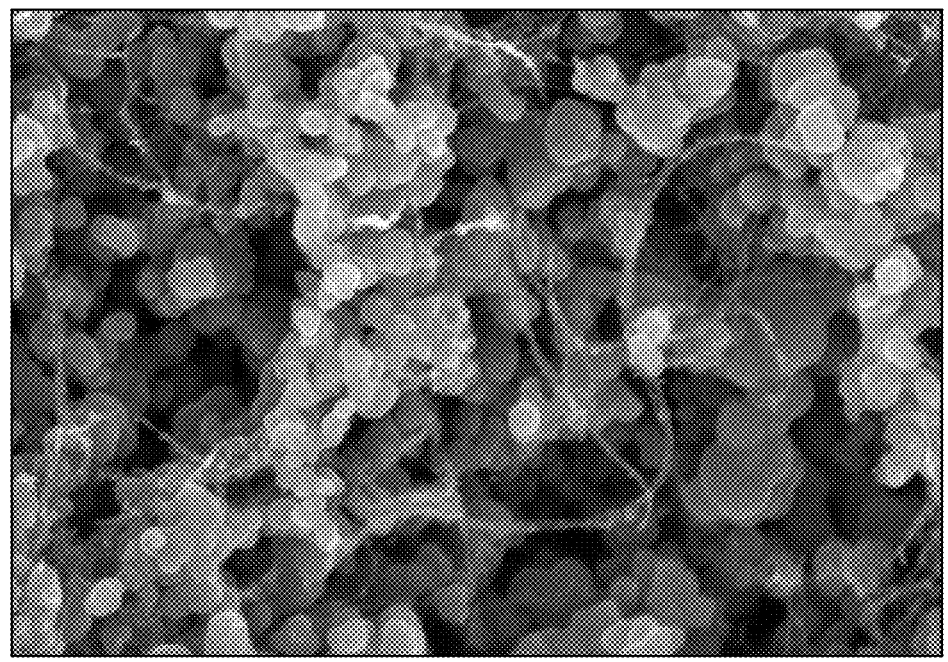
FIG. 11B is an SEM image of the preblend of FIG. 11A magnified ×70,000.

In the second series of examples, shown in Table 2, the same SWCNT as the first example was used. In this example, however, a different liquid medium was used to prepare two preblends of different ratios. These preblends of CNT and carbon black were made using o-dichlorobenzene as the organic liquid. The blends were prepared by first mixing the SWCNT in o-dicholorobenzene at a concentration of about 30 grams of SWCNT per liter of solvent with the IKA T25 mixer for 15 minutes. Then the carbon black was mixed in o-dicholorobenzene for 25 minutes at a concentration of about 20 to 30 grams per liter of solvent. Finally, appropriate amounts of the two mixtures were combined and stirred for about one hour with the IKA T25 mixer. The solvent was then removed by filtration and the remaining wet blend dried under vacuum at 70° C. for 48 hours. In this series, the effect of blend ratio and carbon black type are explored. Two blend ratios were used in rubber formulations, 5:1 and 13:1 carbon black to CNT. Two types of carbon black were used, N550 and N220, which differ primarily in particle size. SEM images of the resulting preblends prior to its use in a rubber formulation are given in FIGS. 8-11. FIG. 8 and FIG. 9 show N220 carbon black/SWCNT preblends at a 5:1 and 7:1 ratio, respectively at 40,000×. FIG. 10 and FIG. 11 show N550 carbon black/SWCNT preblends at a 5:1 and 7:1 ratio, respectively, with FIGS. 10A and 11A at 25,000×, and FIGS. 10B and 11B at 70,000×. The base EPM elastomer composition, the rubber mixing and the testing were the same as for the first series. The rubber formulations used and the results are shown in Table 2 below.

Consistent with the inspection of the SEM images of FIGS. 3A-3D and FIGS. 8-11, the use of o-dicholorobenzene seems to provide a better end result than the use of ethanol in the wet blending process. This can be seen, for example, by comparing the elongation at break for the Examples 6, 7, and 10 in Table 2 versus the previous Ex. 3 in Table 1. The o-dicholorobenzene blends give higher elongation, implying a tougher compound. The higher ratio of carbon black to CNT seems to give better properties than the lower ratio, suggesting better dispersion in the elastomer, perhaps due to the CNT network being more expanded by the carbon black. The DeMattia crack growth data also shows o-dicholorobenzene blends give even better results than the ethanol blends.

It should be noted that increased elongation at break for the example compounds along with significant improvement in 10% modulus, runs counter to the trends observed in the literature. For example, the Ex. 6 and 7, which showed about 20% increase in 10% modulus, was accompanied by a 60% increase in elongation at break. The CB/SWCNT combinations also showed improvements in tear strength, cut growth rates on the DeMattia test and fatigue resistance. The simultaneous improvement in modulus and elongation is believed attributable to improved dispersion of the CNT in the elastomer composition, which is very difficult to quantify. Therefore, the invention may be characterized by the simultaneous increase in modulus (e.g. 10% modulus) and elongation at break relative to the same composition without CNT. Preferably, the increase in one or both properties is in the range of at least 20%, or at least 30%, or at least 50%.

It may also be noted conductivity of the rubber did not seem to be dependent on the method of dispersing the CNT, just on their presence in sufficient amounts and the type of carbon black used. When the carbon black used is not very conductive, we see a difference in the conductivity, favoring the solution blended CB/SWCNT over simple SWCNT addition. When the carbon black is very conductive—i.e. N220—we see a much smaller difference.

Thus, the present inventive method of dispersing CNT using a carbon black/CNT preblend in elastomers results in improved dispersion over prior art methods, resulting in simultaneously increased modulus and elongation in the resulting elastomer composition. The inventive elastomer compositions may be used to make various rubber articles, for example, belts, hose, vibration control components, tires, sheet goods, and the like.

Although the present invention and its advantages have been described in detail, it should be understood that various changes, substitutions, and alterations can be made herein

TABLE 2

|  | Comp. Ex. 4 | Comp. Ex. 5 | Ex. 6 | Ex. 7 | Comp. Ex. 8 | Comp. Ex. 9 | Ex. 10 |
|---|---|---|---|---|---|---|---|
| EPM | 100 | 100 | 100 | 100 | 100 | 100 | 100 |
| N550 | 60 | 50 | 0 | 30.65 | 0 | 0 | 0 |
| N220 | 0 | 0 | 0 | 0 | 60 | 50 | 30.65 |
| ZDMA Coagent | 15 | 15 | 15 | 15 | 15 | 15 | 15 |
| Paraffin Oil | 10 | 10 | 10 | 10 | 10 | 10 | 10 |
| Antioxidant | 1 | 1 | 1 | 1 | 1 | 1 | 1 |
| SWCNT | — | 3.87 | — | — | — | 3.87 | — |
| N550, 5:1 CB:CNT | — | — | — | 23.22 | — | — | — |
| N550, 13:1 CB:CNT | — | — | 53.87 | — | — | — | — |
| N220, 5:1 CB:CNT | — | — | — | — | — | — | 23.22 |
| Retarder | 0.3 | 0.3 | 0.3 | 0.3 | 0.3 | 0.3 | 0.3 |
| Peroxide (40KE) | 5 | 5 | 5 | 5 | 5 | 5 | 5 |
| SWCNT (vol. %) | 0 | 1.25 | 1.25 | 1.25 | 0 | 1.25 | 1.25 |
| MDR-ML (lb-in) | 1.85 | 1.89 | 2.12 | 1.96 | 2.73 | 2.79 | 2.62 |
| MDR-MH (lb-in) | 32.51 | 25.8 | 24.89 | 23.42 | 32.36 | 26.88 | 26.33 |
| MDR-t90 (min) | 11.46 | 8.04 | 6.35 | 6.51 | 10.66 | 7.61 | 7.78 |
| MV/132° C. (mu) | 59.4 | 58.1 | 63.3 | 59.7 | 74.9 | 76.5 | 68.7 |
| RPA-G' (kPa) | 3513 | 2737 | 2740 | 2636 | 3903 | 3323 | 3159 |
| RPA-tan δ | 0.070 | 0.082 | 0.102 | 0.104 | 0.098 | 0.117 | 0.110 |
| Stress at Break (psi)(RT) | 3179 | 3080 | 3154 | 3450 | 3977 | 3319 | 3859 |
| % Elong. at Break (RT) | 331.3 | 508.6 | 529.0 | 557.0 | 388.8 | 481.6 | 509.4 |
| 10% Modulus (psi) | 185.8 | 192.4 | 225.6 | 220.3 | 212.6 | 239.0 | 234.1 |
| Shore A Hardness | 79 | 78 | 79 | 79 | 80 | 81 | 80 |
| Stress at Break 125° C. | 925 | 825 | 1031 | 925 | 1221 | 961 | 1002 |
| % Elong at break 125° C. | 177.6 | 289.1 | ~315 | ~330 | 212.8 | ~305 | ~420 |
| 10% Mod. 125° C. (psi) | 114 | 97 | 84 | 98 | 108 | 103 | 102 |
| DeMattia 125° C.(Mcycle/in) | 3.3 | 1200 | 1333 | 1333 | 28 | 700 | 783 |
| C-Tear w/g (lb/in) (RT) | 327 | 394 | 405 | 410 | 308 | 390 | 402 |
| C-Tear w/g (lb/in) (125° C.) | 117 | 133 | 144 | 141 | 128 | 144 | 141 | without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A preblend composition comprising carbon nanostructures and a particulate solid, said preblend composition prepared by wet-mixing said carbon nanostructures and said particulate solid in a liquid medium, wherein the preblend composition comprises solid core particles of said particulate solid coated with a shell of said carbon nanostructures forming a core-shell material;
   wherein the core particles comprise carbon-based particles selected from the group consisting of graphitic carbon and glassy carbon; and
   wherein the core particles are regular or irregular in shape and have a size in the range of 20 nm to 20 µm in terms of average longest dimension.

2. A preblend composition comprising carbon nanostructures and a particulate solid, said preblend composition prepared by wet-mixing said carbon nanostructures and said particulate solid in a liquid medium, wherein the preblend composition comprises solid core particles of said particulate solid coated with a shell of said carbon nanostructures forming a core-shell material;
   wherein the core particles comprise carbon-based particles selected from the group consisting of graphitic carbon and glassy carbon; and
   wherein the carbon nanostructures consist of one or more from the group consisting of fullerenes, single-walled carbon nanotubes, multi-walled carbon nanotubes, and their chemical derivatives.

3. The preblend composition of claim 1 wherein the shell coating on the core particles cover a surface area in the range of 50-100% of the total surface area of the core particles.

4. The preblend composition of claim 1 wherein said preblend composition is further prepared by drying after said wet-mixing.

5. The preblend composition of claim 1 wherein the preblend further comprises a nanotube network with carbon black particles dispersed therein.

6. A material composition comprising the preblend composition of claim 1, wherein said material composition is a polymer composition, an electrolyte medium, a paint, a coating, or a slurry.

7. An article comprising the preblend composition of claim 1, wherein said article is a rubber article, a battery electrode, or a super capacitor.

8. The article of claim 7, wherein said rubber article is a belt, hose, tire, or vibration control component.

9. A method comprising:
   dispersing carbon nanostructures in a liquid medium to form a dispersion;
   blending the dispersion with a particulate solid to form a blend; and
   drying said blend to form a preblend;
   wherein the preblend comprises a core-shell material comprising a core of particles of said particulate solid coated with a shell of said carbon nanostructures;
   wherein the core particles comprise carbon-based particles selected from the group consisting of graphitic carbon and glassy carbon; and
   wherein the carbon nanostructures consist of one or more from the group consisting of fullerenes, single-walled carbon nanotubes, multi-walled carbon nanotubes, and their chemical derivatives.

10. The method of claim 9 further comprising adding the preblend to a polymer in a compounding process.

11. The method of claim 9 further comprising using the preblend as part of a battery electrode or as part of an electrolyte medium in a super capacitor.

12. The method of claim 9 further comprising using the preblend in an electrolyte medium, paint, coating, or slurry.

13. The method of claim 9 wherein said liquid medium is an organic liquid.

14. The method of claim 9 wherein said liquid medium comprises substituted aromatic molecules, alkyl substituted aromatics, halogenated substituted molecules, halogenated alkanes, partially hydrogenated aromatics, alkylamines, cyclic ethers, o-dichlorobenzene, xylene, benzene, dimethylformamide, ethylene chloride, chloroform, 1,2,4-trimethylbenzene, 1,2,3,4-tetramethylbenzene, tetrahydrofuran, 1,2-dibromobenzene, 1,1,2,2-tetrachloroethane, 1,2,3,4-tetrahydronaphthalene, octadecylamine, acetone and mixtures thereof.

15. The method of claim 9 wherein said liquid medium is water or water stabilized by means of surfactant with such surfactant being at least one member selected from the group consisting of sodium cholate, sodium octylbenzene sulfonate, sodium butylbenzene sulfonate, sodium benzoate, sodium dodecyl sulfate, $C_8H_{17}C_6H_4(OCH_2CH_2)n\text{-}OH$ wherein n is 10, dodecyltrimethylammonium bromide, dextrin, and polystyrene-polyethylene oxide diblock copolymer.

16. The preblend composition of claim 2 wherein the shell coating on the core particles cover a surface area in the range of 50-100% of the total surface area of the core particles.

17. The preblend composition of claim 2 wherein said preblend composition is further prepared by drying after said wet-mixing.

18. The preblend composition of claim 2 wherein the preblend further comprises a nanotube network with carbon black particles dispersed therein.

19. A material composition comprising the preblend composition of claim 2, wherein said material composition is a polymer composition, an electrolyte medium, a paint, a coating, or a slurry.

20. An article comprising the preblend composition of claim 2, wherein said article is a rubber article, a battery electrode, or a super capacitor.

21. The article of claim 20, wherein said rubber article is a belt, hose, tire, or vibration control component.

* * * * *